United States Patent
Kwon et al.

(10) Patent No.: US 8,149,795 B2
(45) Date of Patent: Apr. 3, 2012

(54) METHOD AND APPARATUS FOR WIRELESS COMMUNICATION IN HIGH-FREQUENCY BAND

(75) Inventors: Chang-yeul Kwon, Yongin-si (KR); Seong-soo Kim, Seoul (KR); Ji-sung Oh, Seongnam-si (KR); Ki-bo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1076 days.

(21) Appl. No.: 11/783,178

(22) Filed: Apr. 6, 2007

(65) Prior Publication Data

US 2008/0013519 A1 Jan. 17, 2008

Related U.S. Application Data

(60) Provisional application No. 60/830,700, filed on Jul. 14, 2006.

(30) Foreign Application Priority Data

Sep. 20, 2006 (KR) .................. 10-2006-0091363

(51) Int. Cl.
*H04W 4/00* (2009.01)
*H04J 3/00* (2006.01)
*H04B 7/212* (2006.01)

(52) U.S. Cl. ........ 370/336; 370/328; 370/329; 370/345; 370/347; 370/348

(58) Field of Classification Search ............... 455/67.11, 455/68–69, 418–420, 422.1, 423–425, 434, 455/450–451, 452.1–452.2, 453, 455, 464, 455/466, 509–517, 556.2, 500, 503, 550.1, 455/560–561; 370/328–329, 336–338, 341, 343, 345–350, 435–437, 442–443, 445, 447–448, 458–459, 461–462

See application file for complete search history.

(56) References Cited

U.S. PATENT DOCUMENTS

| | | | |
|---|---|---|---|
| 5,483,676 A * | 1/1996 | Mahany et al. ............ 455/67.14 |
| 7,088,702 B2 * | 8/2006 | Shvodian ..................... 370/348 |
| 7,359,398 B2 * | 4/2008 | Sugaya ........................ 370/431 |
| 7,388,833 B2 * | 6/2008 | Yuan et al. ................. 370/230.1 |
| 7,496,081 B2 * | 2/2009 | Salokannel et al. .......... 370/348 |
| 7,684,333 B1 * | 3/2010 | Dasylva et al. ............ 370/235.1 |
| 2003/0063619 A1 | 4/2003 | Montano et al. |
| 2003/0152059 A1 | 8/2003 | Odman |
| 2003/0224787 A1 * | 12/2003 | Gandolfo ...................... 455/434 |
| 2004/0001536 A1 * | 1/2004 | Lohtia et al. ................. 375/225 |
| 2004/0003296 A1 * | 1/2004 | Robert et al. ................ 713/300 |
| 2005/0135416 A1 * | 6/2005 | Ketchum et al. ............. 370/469 |
| 2005/0141547 A1 | 6/2005 | Cho et al. |
| 2006/0025150 A1 * | 2/2006 | Kim et al. .................... 455/453 |
| 2006/0062200 A1 * | 3/2006 | Wang et al. .................. 370/352 |
| 2006/0099956 A1 * | 5/2006 | Harada et al. ............. 455/452.2 |
| 2006/0227740 A1 * | 10/2006 | McLaughlin et al. ........ 370/329 |
| 2007/0025384 A1 * | 2/2007 | Ayyagari et al. ............ 370/445 |
| 2007/0230499 A1 * | 10/2007 | Iwamura ...................... 370/445 |

* cited by examiner

*Primary Examiner* — Meless Zewdu
(74) *Attorney, Agent, or Firm* — Sughrue Mion, PLLC

(57) ABSTRACT

A beacon packet is provided. The packet includes a first information field that includes channel-time-allocation information in a wireless network; and information about whether there is residual channel time that can be allocated to a device that belongs to the wireless network.

49 Claims, 14 Drawing Sheets

WIRELESS NETWORK(100)

METHOD AND APPARATUS FOR WIRELESS COMMUNICATION IN HIGH-FREQUENCY BAND

CROSS-REFERENCE TO RELATED APPLICATION

This application claims priority from Korean Patent Application No. 10-2006-0091363 filed on Sep. 20, 2006 in the Korean Intellectual Property Office, and U.S. Provisional Patent Application No. 60/830,700 filed on Jul. 14, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to wireless communication. More particularly, the present invention relates to a wireless communication method and apparatus using a high-frequency band.

2. Description of the Related Art

With the advent of wireless networks and increased demand for multimedia-data transmission, there is an increasing need for studies on effective transmission. Furthermore, the need for transmitting high-quality video such as DVD images and HDTV images between various home devices is increasing.

Currently, a technology standardization for transmitting mass-storage data in a wireless home network is in progress by a task group of IEEE 802.15.3c. This standard, called "mmWave" (Millimeter Wave), uses an electromagnetic waves having millimeter wavelengths (i.e., 30 GHz to 300 GHz) for transmission of data. This frequency band is an unlicensed band used by telecommunication operators, radio astronomy, and vehicle-collision prevention.

The carrier frequency of IEEE 802.11b and IEEE 802.11g is 2.4 GHz, and the channel bandwidth is approximately 20 MHz. Further, the carrier frequency of IEEE 802.11a and IEEE 802.11n is 5 GHz, and the channel bandwidth is approximately 20 MHz. In contrast, the mm Wave uses a carrier frequency of 60 GHz, and has a channel bandwidth of around 0.5 to 2.5 GHz. Hence, the mmWave has much higher frequencies and channel bandwidths than the conventional IEEE 802.11 line standards. Likewise, by using high-frequency signals having millimeter wavelengths, a very high transmission rate of several Gbps units can be expressed, and the size of an antenna can be made less than 1.5 mm, thereby implementing a single chip that includes an antenna.

Especially, research on the transmission of uncompressed audio or video data (hereinafter, called "uncompressed AV data") between wireless devices using the high bandwidth of a millimeter wave are in progress. Compressed AV data is compressed with loss in a way that removes the parts less sensitive to the senses of sight and hearing through the processes such as motion compensation, DCT conversion, and variable-length encoding. Hence, the image quality can deteriorate due to loss in the compressed AV data, and the AV data compression between the transmitting device and the receiving device, and the restoration process must follow the same standard, which causes problems. In contrast, because uncompressed AV data includes digital values (e.g., R, G, and B elements) that represent pixel elements, high-quality images can be provided, which is advantageous.

Likewise, because large amounts of data are transmitted in high-frequency wireless communication, it is important to reduce the waste of wireless resources. Hence, there is a need for a technology that can reduce the bandwidth waste in high-frequency wireless communication.

SUMMARY OF THE INVENTION

An aspect of the present invention is to effectively use wireless resources.

The present invention will not be limited to the technical aspects described above. Other aspects not described herein will be more definitely understood by those in the art from the following detailed description.

According to an exemplary embodiment of the present invention, there is provided a beacon packet including: a first information field that includes channel-time-allocation information in a wireless network; and a free channel time field that comprises information about whether there is residual channel time that can be allocated to a device that belongs to the wireless network.

According to an exemplary embodiment of the present invention, there is provided a beacon packet including: an information field that includes channel-time-allocation information in a wireless network; and a contention-based control period (CBCP) field that comprises information about a CBCP having a fixed temporal position, in which a device that belongs to the wireless network can occupy media through contention.

According to an exemplary embodiment of the present invention, there is provided a wireless communication method including: generating a management packet that includes information about whether there are residual channel times that can be allocated to a device that belongs to a wireless network; and transmitting the generated management packet to a wireless medium.

According to an exemplary embodiment of the present invention, there is provided a wireless communication method performed by a wireless communication apparatus, the method including: receiving a management packet that includes information about whether there are residual channel times that can be allocated to a device that belongs to a wireless network; and controlling whether the wireless communication apparatus requests a channel-time allocation to a coordinator that manages the wireless network according to the information about whether there are residual channel times included in the received management packet.

According to an exemplary embodiment of the present invention, there is provided a wireless communication apparatus including: a MAC-processing unit that generates a management packet that includes information about where there are residual channel times that can be allocated to a device that belongs to a wireless network; and a transceiver that transmits the generated management packet to a wireless medium.

According to an exemplary embodiment of the present invention, there is provided a wireless communication apparatus including: a transceiver that receives a management packet that includes information about whether there are residual channel times that can be allocated to a device that belongs to a wireless network; and a MAC-processing unit that controls whether the wireless communication apparatus requests a channel-time allocation to a coordinator that manages the wireless network according to the information about whether there are residual channel times included in the received management packet.

BRIEF DESCRIPTION OF THE DRAWINGS

The above and other features and advantages of the present invention will become apparent by describing in detail exemplary embodiments thereof with reference to the attached drawings in which.

DETAILED DESCRIPTION OF THE INVENTION

Figure 1:
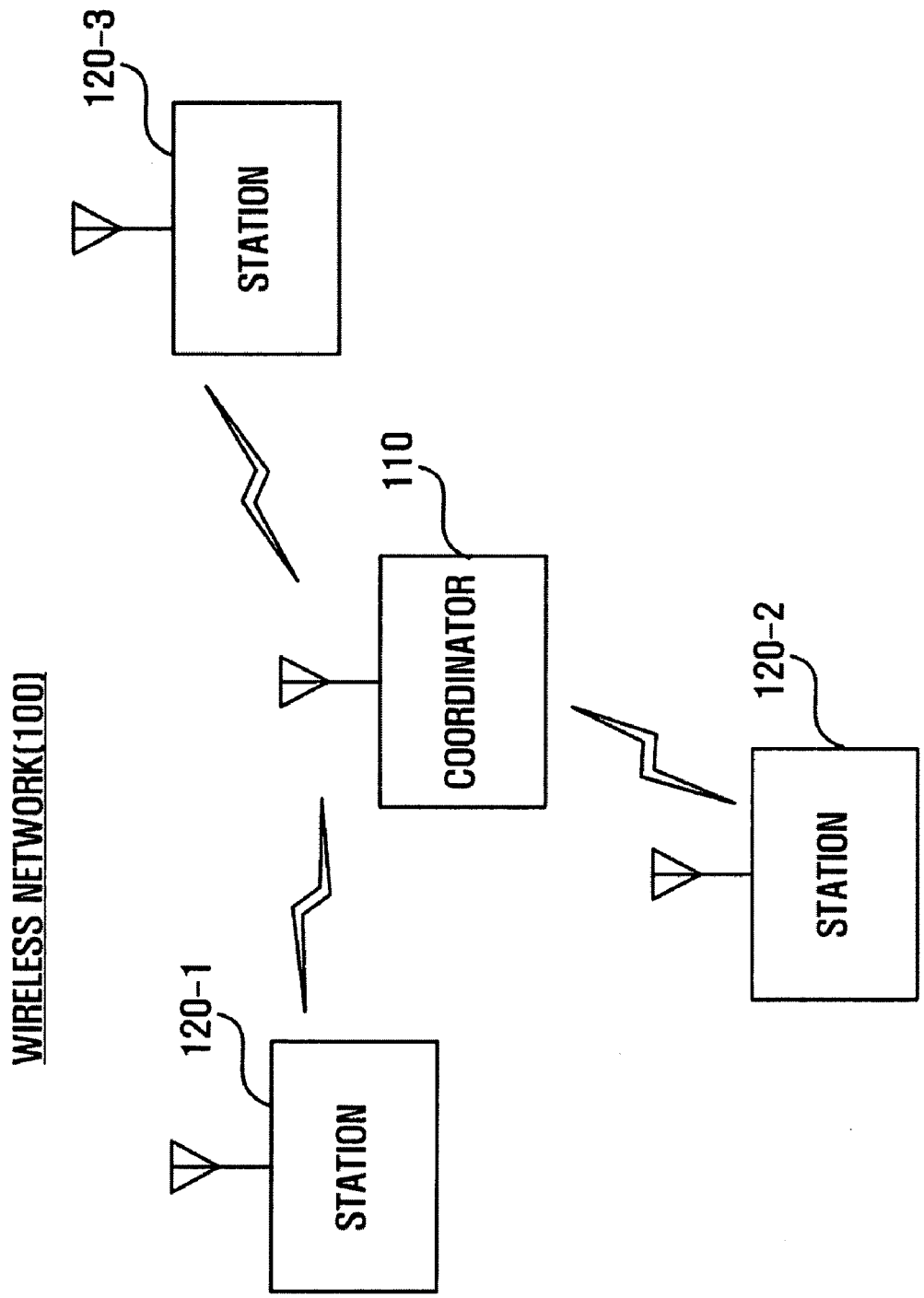
FIG. 1 illustrates a wireless network 100 according to an exemplary embodiment of the present invention.

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

FIG. 1 illustrates a wireless network 100 according to an exemplary embodiment of the present invention. The wireless network 100 is preferably, but not necessarily, a wireless video area network (WVAN) that can support various applications for high-speed transmission of audio and video (AV) data. The AV data transmitted from WVAN can be in a compressed or uncompressed state, and some examples of such data are uncompressed 1080$p$ AV data, uncompressed 1080$i$ AV data, 1080$p$ AV compressed using MPEG-2, uncompressed 5.1 surround sound audio data, and other similar data.

The illustrated wireless network 100 includes two types of devices: a coordinator 110 and stations 120-1, 120-2, and 120-3. Here, the coordinator 110 can be a tablet display such as an LCD, a plasma and a digital lighting processing (DLP), or a sink device such as a blue-ray disc (BD) recorder, a high-definition-DVD (HD-DVD) recorder and a personal video recorder (PVR). Each of the stations 120-1, 120-2 and 120-3 can be a source device such as a set-top box, a BD player, an HD-DVD player, an HD-DVD recorder, a PVR, or an HD-broadcasting receiver. However, the present invention is not limited to such devices, and the coordinator 110 and the station 120 can be implemented by another type of device. Further, the coordinator 110 can be a source device while one of the stations 120-1, 120-2 and 120-3 is a sink device.

Coordinator 110 and stations 120-1, 120-2 and 120-3 of the wireless network 100 can support two types of physical layers (PHY): a high-rate PHY (HRP) layer and a low-rate PHY (LRP) layer. Further, a device capable of only supporting an LRP layer can exist in the wireless network depending on the physical performance.

The HRP layer can be used for the high-rate transmission of data (e.g., uncompressed AV data). Preferably, but not necessarily, the HRP can support an output of several Gbps. The HRP can be used in an adaptive antenna technology in order to adjust the output direction or the receiving direction for wireless signals. Here, the wireless signals outputted by the HRP layer are directional. Hence, the HRP can be used for unicasts. Because high-rate transmission is possible with HRP layers, it is preferable, but not necessary, that the HRP layer is used to transmit isochronous data such as uncompressed AV data. However, the present invention is not limited to such use, and the HRP layer can also be used to transmit anisochronous data, a medium access control (MAC) command, antenna-steering information, and upper-layer control data for AV devices.

The LRP layer can be used for low-rate transmission. For example, the LRP layer provides a two-way link of several Mbps. Because wireless signals outputted from the LRP layer are almost omni-directional, the LRP layer can be used for both the unicast and the broadcast. The LRP layer can transmit low-rate isochronous data, low-rate anisochronous data, a MAC command that includes a beacon, a response on the HRP packet, antenna-steering information, capabilities information, and upper-layer control data for AV devices.

Preferably, but not necessarily, a communication channel used by the HRP (hereinafter, called "HRP channel") has a wider bandwidth than that of a communication channel used by the LRP layer (hereinafter, called "LRP channel"). Here, each HRP channel can correspond to one or more LRP channels. Preferably, but not necessarily, the frequency band of the LRP layer channel corresponding to the HRP channel exists within the frequency band of the HRP channel.

Figure 2:
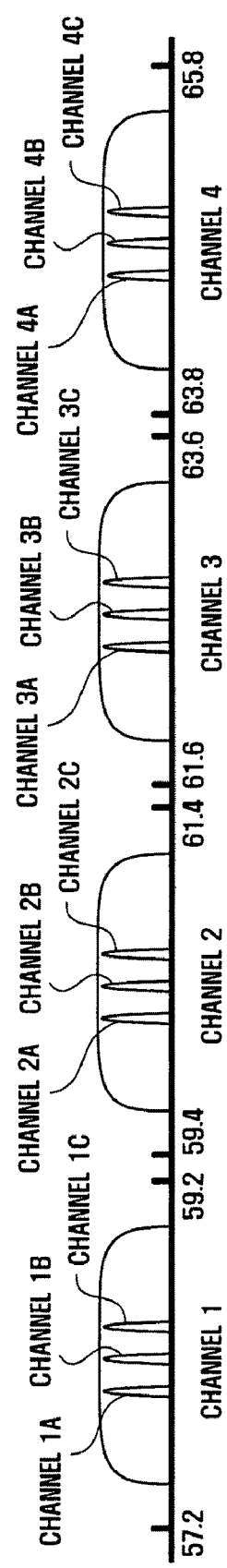
FIG. 2 illustrates frequency bands of a high-rate physical (HRP) layer channel and a low-rate physical (LRP) layer channel according to an exemplary embodiment of the present invention.

FIG. 2 illustrates frequency bands of an HRP channel and an LRP channel according to an exemplary embodiment of the present invention. 4 HRP channels (channels 1 to 4) are presented in the illustrated frequency band, and the corresponding 3 LRP channels (channel 1A-1C, channel 2A-2C, channel 3A-3C, and channel 4A-4C) exist within the frequency band of each HRP channel. The HRP channel has about 2 GHz bandwidth, and the mean frequency is around 60 GHz±several GHz. An example of specific frequency bands of HRP channels illustrated in FIG. 2 is shown in Table 1.

TABLE 1

An example of specific frequency bands of HRP channels

| HRP Channel Index | Initial Frequency (GHz) | Mean Frequency (GHz) | Terminal Frequency (GHz) |
| --- | --- | --- | --- |
| 1 | 57.608 | 58.608 | 59.608 |
| 2 | 59.720 | 60.720 | 61.720 |
| 3 | 61.832 | 62.832 | 63.832 |
| 4 | 63.944 | 64.944 | 65.944 |

In Table 1, each HRP channel has the bandwidth of 2 GHz. Further, an example of specific frequency bands of LRP channels corresponding to each HRP channel is shown in Table 2.

TABLE 2

An example of specific frequency bands of LRP channels

| LRP Channel Index | Initial Frequency (MHz) | Mean Frequency (MHz) | Terminal Frequency (MHz) |
| --- | --- | --- | --- |
| A | $f_{c(HRP)} - 203$ | $f_{c(HRP)} - 156.75$ | $f_{c(HRP)} - 110.5$ |
| B | $f_{c(HRP)} - 46.25$ | $f_{c(HRP)}$ | $f_{c(HRP)} + 46.25$ |
| C | $f_{c(HRP)} + 110.5$ | $f_{c(HRP)} + 156.75$ | $f_{c(HRP)} + 203$ |

In Table 2, $f_{c(HRP)}$ is the mean frequency of the corresponding HRP channel, and each LRP channel has the bandwidth of 92.5 MHz. The frequency bands illustrated in Tables 1 and 2 are merely exemplary, and the present invention is not limited to the frequency bands. Hence, the HRP and the LRP layer can use different mean frequencies and bandwidths.

The HRP and the LRP layer can be operated in the overlapped frequency band. Here, the use of channels can be coordinated by the MAC in time division multiple access (TDMA) method. Further, in FIG. 2 and Tables 1 and 2, 4 HRP channels and 3 LRP channels corresponding to each HRP channel (a total of 12 LRP channels), but this is merely exemplary, and thus the number of HRP channels that can be supported by the device, and the number of LRP channels corresponding to the HRP channels can be changed.

Referring to FIG. 1, the existence of the wireless network 100 is not affected by the number of stations 120-1, 120-2 and 120-3. Hence, none, or one or more stations 120-1, 120-2 and 120-3 can exist in the wireless network 100. Instead of having the coordinator 110, one of the stations 120-1, 120-2 and 120-3 can function as a coordinator depending on the capabilities of the one of the stations 120-1, 120-2 and 120-3, and the device having the capabilities to function as the coordinator is called a coordinator-capable device. When the coordinator-capable device wants to form a new wireless network, the device can select one of a plurality of HRP channels and one of a plurality of corresponding LRP channels, respectively. When the HRP channel and the LRP layer channel are selected, the coordinator-capable device can start a new wireless network by transmitting a beacon packet (hereinafter, called a "beacon") for the management of the wireless network. The coordinator-capable device that has started a new wireless network becomes a coordinator as coordinator 110 by transmitting a beacon.

Figure 3:
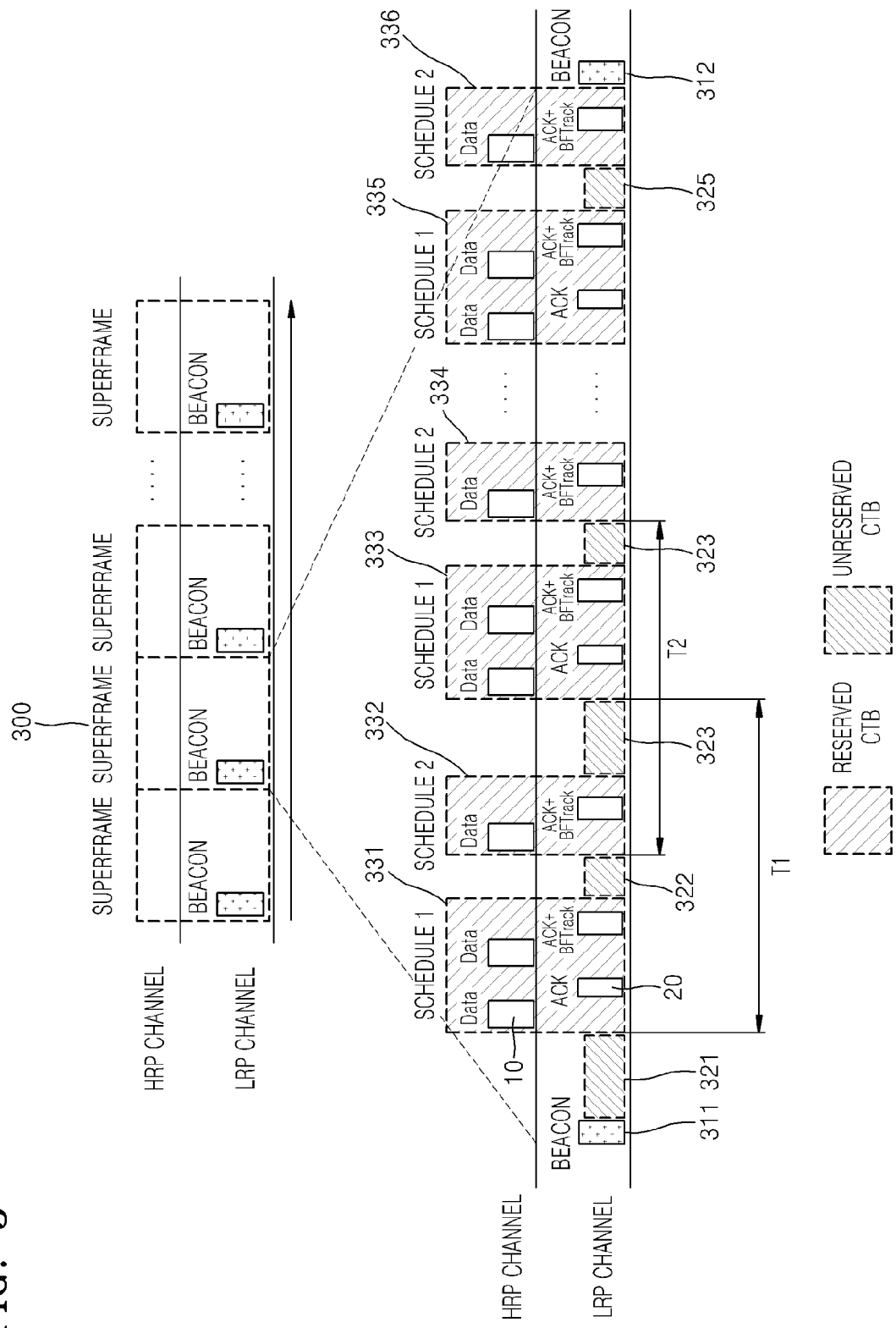
FIG. 3 illustrates a communication timing managed by a coordinator according to an exemplary embodiment of the present invention.

The coordinator 110 regulates the communication timing in the wireless network using the beacon, and the stations 120-1, 120-2 and 120-3, execute communication according to the communication timing regulated by the regulator 110. An example of the communication timing managed by the coordinator is shown in FIG. 3. Such a communication timing is called a superframe. The superframe 300 includes a beacon period 311 and at least one channel time blocks (CTB) 321, 322, 323, 324 and 325, and 331, 332, 333, 334, 335 and 336.

The beacon period 311 indicates the time when the beacon was transmitted. The beacon includes channel-time-allocation information, and is broadcast to the wireless network by the coordinator 110. Hence, a station 120-1 receives the beacon transmitted by the coordinator, and thus can know the communication timing.

The CTBs 321, 322, 323, 324 and 325, and CTBs 331, 332, 333, 334, 335 and 336 indicate the start sections when a device can occupy the medium, i.e., the channel time. According to an exemplary embodiment of the present invention, CTBs 321, 322, 323, 324 and 325, and 331, 332, 333, 334, 335 and 336 can be divided into a reserved CTBs 331, 332, 333, 334, 335 and 336, and an unreserved CTBs 321, 322, 323, 324 and 325.

The reserved CTB 331 is a channel time allocated to a certain station of the stations 120-1, 120-2 and 120-3, e.g., station 120-1, by the coordinator 110. The coordinator 110 can also allocate a channel time for itself. Hence, coordinator 110 and station 120-1 can occupy the medium in an uncompetitive way.

The reserved CTB 331 can be used for the data transmission using the HRP layer channel. Preferably, but not necessarily, the response of the receiving side on the data transmitted using the HRP layer channel is transmitted through the LRP layer channel. Further, according to an exemplary embodiment of the present invention, the reserved CTB for the communication of the LRP layer channel can exist. Hence, the reserved CTB 331 can be used for the data transmission in the HRP layer channel and the data transmission in the LRP layer channel, and the coordinator 110 and station 120-1 can transmit and receive uncompressed AV data from the reserved CTB 331 allocated to one of coordinator 110 and station 120-1 to the HRP layer channel, or can transmit and receive the response to the HRP data or various commands to the LRP layer channel. Further, the set of related, reserved CTBs is called a schedule. In other words, the schedule is one reserved CTB or a set of a plurality of periodic reserved CTBs. FIG. 3 shows two schedules (schedule 1 and schedule 2) within the superframe.

The unreserved CTBs 321, 322, 323, 324 and 325 are the remaining time periods not including the channel time allocated to the coordinator 110 and stations 120 -1, 120-2 and 120-3 by the coordinator 110. The coordinator 110 and station 120-1 can competitively occupy the medium in the unreserved CTBs 321, 322, 323, 324 and 325. The unreserved CTBs 321, 322, 323, 324 and 325 can be used for the transmission that uses the LRP layer channel. Hence, the coordinator 110 and stations 120-1, 120-2 and 120-3 can transmit various MAC commands or control packets using the LRP layer channel in the unreserved CTBs 321, 322, 323, 324 and 325. For example, a station 120-1 can request the channel-time allocation from the coordinator 110 after occupying the medium in one of the unreserved CTBs 321, 322, 323, 324 and 325. Some examples of the contention-based medium-access mechanism that can be used in the unreserved CTBs 321, 322, 323, 324 and 325 are the carrier sense multiple access (CSMA) method and the slotted Aloha method. However, the present invention is not limited to such methods, and other types of contention-based medium-access mechanisms can be used in the unreserved CTBs 321, 322, 323, 324 and 325.

Further, according to an exemplary embodiment of the present invention, at least one of the unreserved CTBs 321, 322, 323, 324 and 325 can function as a contention-based control period (CBCP). For example, the unreserved CTB 321 can function as CBCP 321. The CBCP 321 can be used so that coordinator 110 and station 120-1 can transmit an urgent control command or a management command. For example, if the station 120-1 did not receive the beacon transmitted from the beacon period 311, the station 120-1 cannot find out the channel time (at least one of the reserved CTBs 321, 322, 323, 324 and 325) allocated to itself. Here, the station 120-1 can request the channel-time-allocation information from the coordinator 110 in the CBCP 321. Hence, preferably, but not necessarily, the CBCP 321 exists at the fixed position for each superframe so that the station that missed the beacon can use the CBCP 321. It is preferable, but not necessary, that the CBCP is positioned at the position immediately following the beacon period 311. The station 120-1 can try the medium occupation using the contention-based medium access mechanism.

Figure 4:
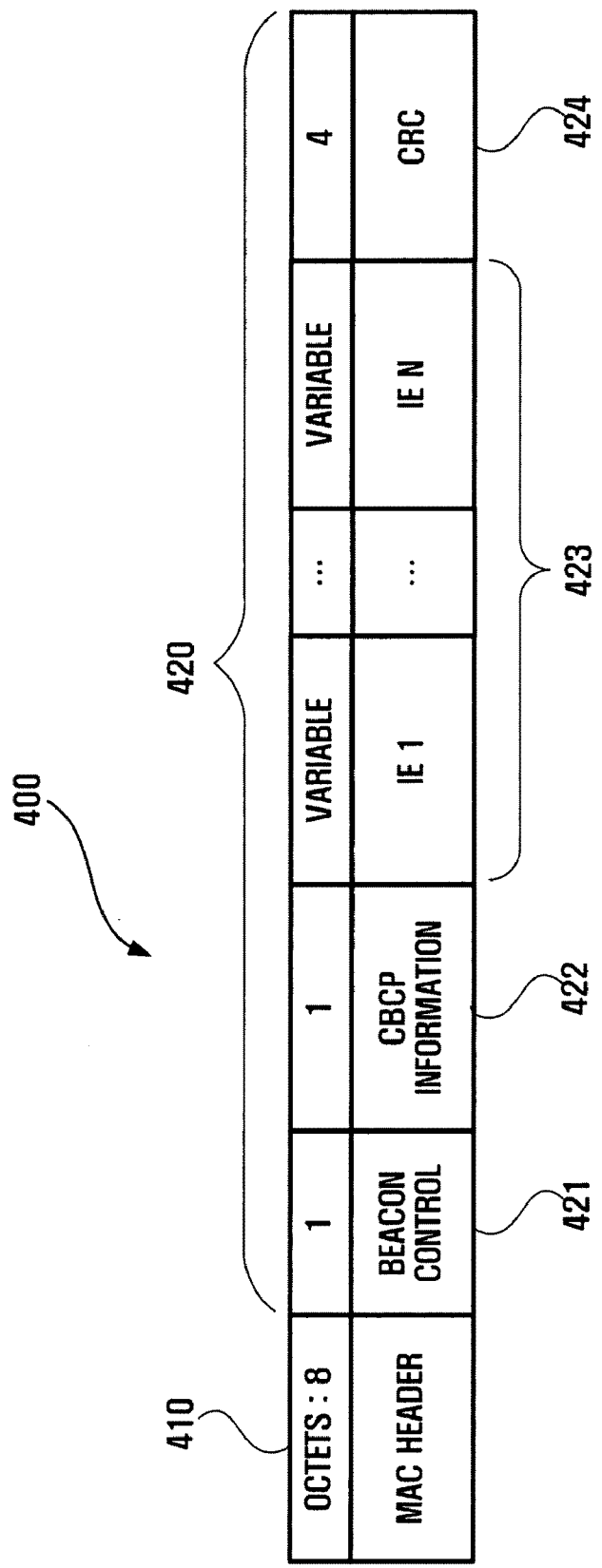
FIG. 4 illustrates the structure of a beacon packet according to an exemplary embodiment of the present invention.

As illustrated in FIG. 3, in order to regulate the communication timing, the coordinator 110 generates the beacon that includes the channel-time-allocation information, and broadcasts the beacon to the wireless network 100. The structure of a beacon according to an exemplary embodiment of the present invention is shown in FIG. 4.

The illustrated beacon 400 includes the MAC header 410 and the MAC body. The MAC header 410 includes detailed information on the beacon packet such as the types of the packet, the transmitter's address of the packet, and the receiver's address of the packet (not shown).

The MAC body 420 includes a beacon-control field 421, a CBCP-information field 422, at least one information-element field 423, and a CRC field.

The beacon-control field 421 includes control information about the beacon. Here, the control information includes the transmission interval of the beacon, information on the CTB divided for a special purpose, and others.

The CBCP-information field 422 includes information on the aforementioned CBCP 321. Here, the information on the CBCP can include the information on at least one of the termination time-point and the start time-point of the CBCP 321. Hence, the station 120-1 that received the beacon can get to know the position of the CBCP 321 in the superframe 300. Preferably, but not necessarily, the position and the length of the CBCP 321 is fixed for each superframe, and the station 120-1 that did not receive the beacon can get to know the CBCP 321.

Figure 5:
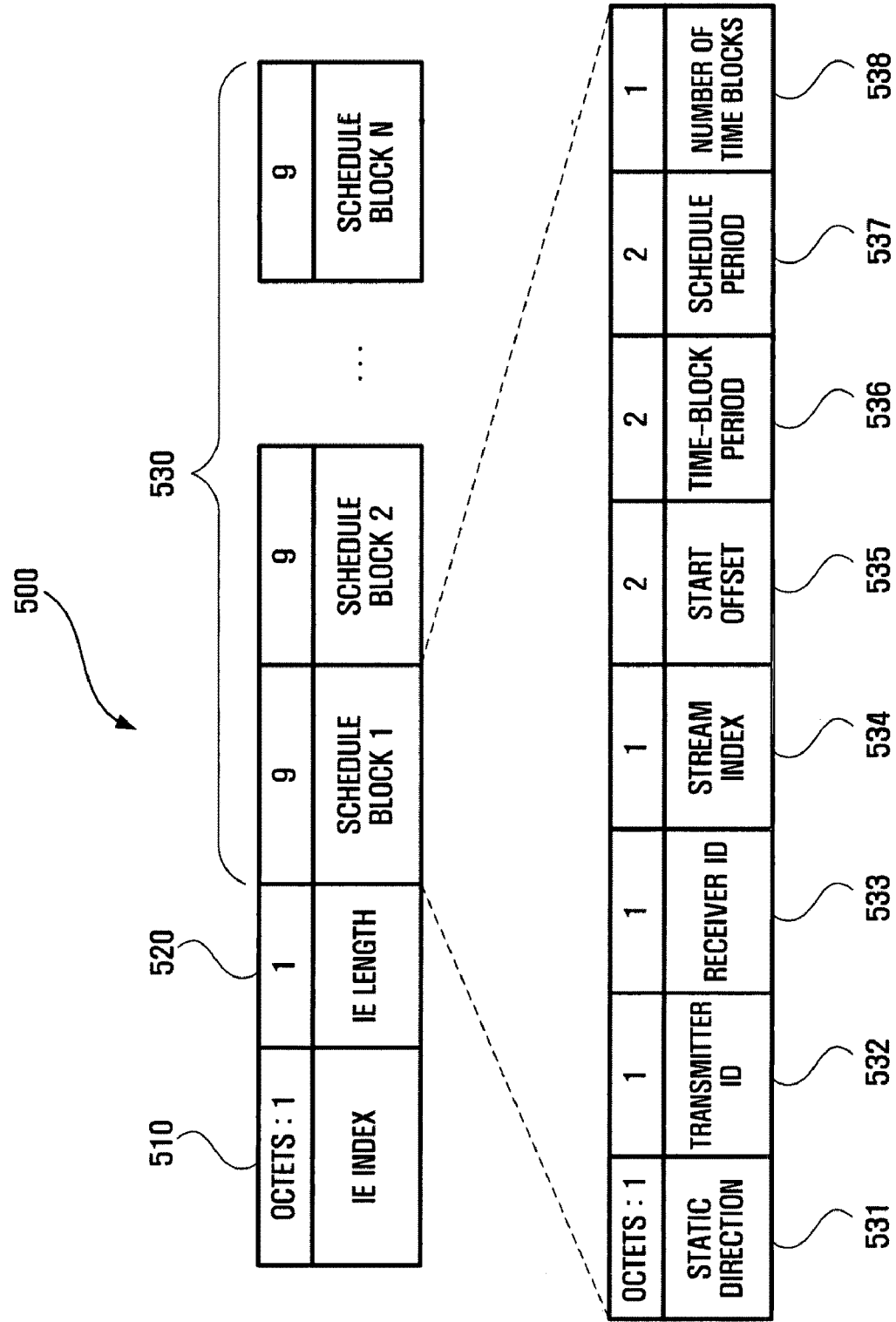
FIG. 5 illustrates a reservation-schedule information element according to an exemplary embodiment of the present invention.

The information-element field 423 includes at least one information element (IE). The information element includes various information necessary for management of the wireless network. Some examples of an information element are a reserved-schedule-information element, a MAC-function-information element that includes the information on the MAC capability of the device registered in the wireless network, and a PHY-function-information element that includes the information on the PHY capability of the device registered in the wireless network. FIG. 5 shows the reserved-schedule-information element.

The reserved-schedule-information element 500 includes an IE index field 510, an IE length field 520, and at least one schedule block 530.

The IE index field 510 includes the identifier to identify the types of information elements, and the IE length field 520 indicates the lengths of schedule blocks 530.

Each schedule block 530 includes a static-indication field 531, a transmitter-ID field 532, a receiver-ID field, a stream-index field 534, a start-offset field 535, a time-block-duration field 536, and a schedule-period field 537, and a number-of-time-block field 538.

The static-indication field 531 shows whether the schedule indicated by the schedule block 530 is a static schedule. The static schedule is allocated for the isochronous stream. Hence, it is expected that the same reserved CTB can exist in the station where the static schedule is allocated for the next superframe. The position of the dynamic schedule can be different depending on the superframe.

The transmitter-ID field 532 and the receiver-ID field 533 indicate the address of the device to transmit data and the address of the device to receive data in the schedule indicated by each schedule block 530. The address used in the wireless network 100 can be allocated from the coordinator 110 when the station 120-1 is registered in the wireless network 100.

The stream-index field 534 indicates the stream corresponding to the channel-time allocation.

The start-offset field 535 indicates the time when the first CTB is started in the schedule. The start-offset field 535 can be set as the time offset from the start of the beacon to the first CTB.

The time-block-period field 536 indicates the length of each CTB within the schedule.

The schedule-period field 537 indicates the difference between start times of two consecutive time blocks included in the same schedule. For example, in the superframe of FIG. 4, T1 can be set in the schedule-period field 537 for the schedule 1, and T2 can be set in the schedule-period field 537 for the schedule 2.

The number-of-time-block field 538 indicates the number of CTBs allocated in the schedule in one superframe.

The station 120-1 can get to know the reserved CTB allocated to the station 120-1 itself, and the unreserved CTB that can competitively occupy the medium through the reserved-schedule-information element.

Further, according to an exemplary embodiment of the present invention to reduce the band waste, the station 120-1 can be informed through the beacon whether there is a channel time that can be allocated it. The informing is to remove an unnecessary process of the station 120-1 requesting the channel-time allocation from the coordinator 110. For such a function, the beacon can include a predetermined information field, which is explained with reference to FIG. 6.

Figure 6:
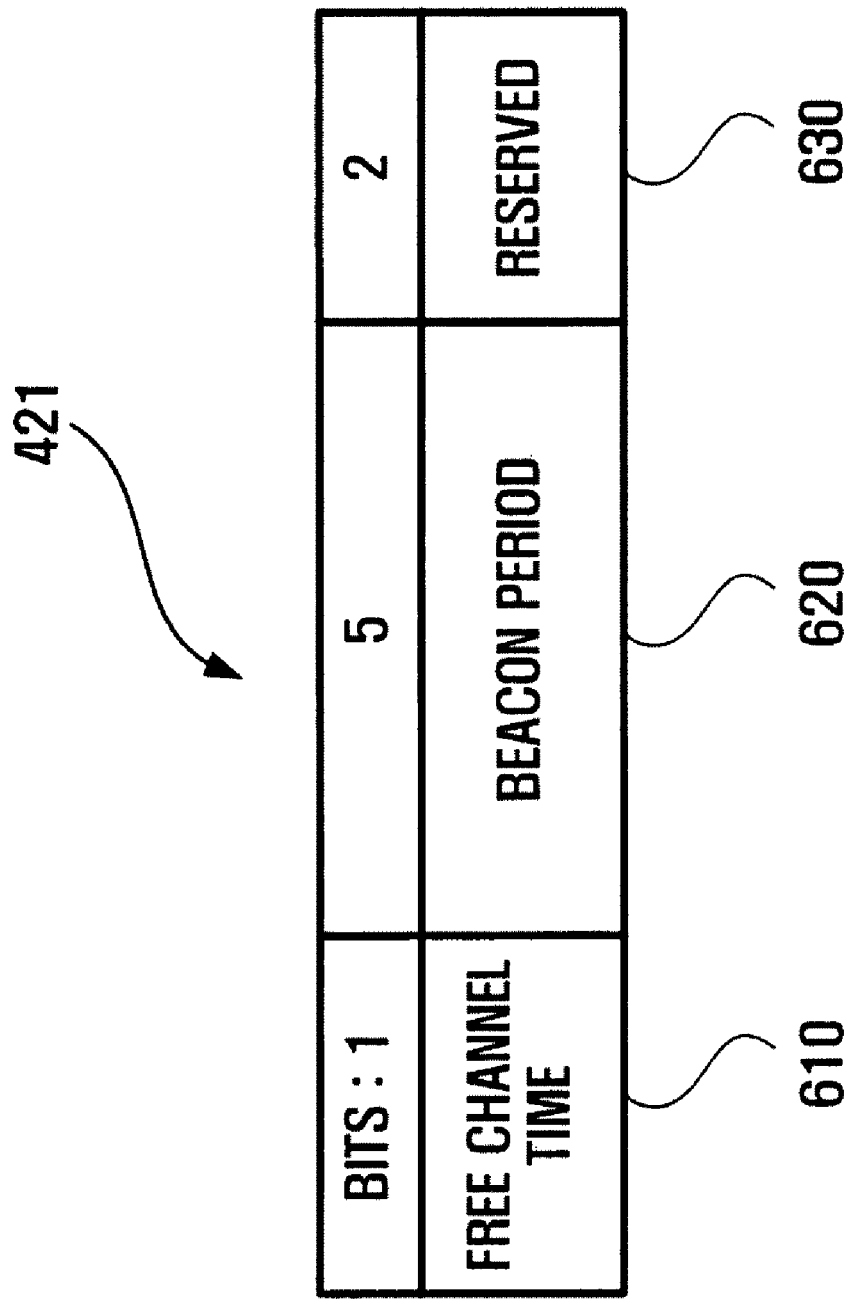
FIG. 6 illustrates an example of a beacon control field of the beacon illustrated in FIG. 4.

FIG. 6 illustrates an exemplary embodiment of a beacon-control field 421 in the beacon 400 illustrated in FIG. 4.

The beacon-control field 421 includes a free-channel-time field 610, a beacon-period field 620, and a reserved field 430.

The free-channel-time field 610 includes the information on whether there is an allocable extra channel time. For example, if the free-channel-time field 610 is set as "1", it indicates that there is an allocable channel time, and if the free-channel-time field 610 is set as "0", it indicates that there is no extra channel time. Hence, when the beacon is received, the station 120-1 of the wireless network 100 can check the free-channel-time field 610, thus checking whether there is an extra channel time. If there is not allocable channel time, the station 120-1 does not perform the channel-time-allocation request. Hence, it can be prevented that the station 120-1 unnecessarily competes in the unreserved CTB in order to request the channel-time allocation, or a packet of unnecessarily requesting the channel-time allocation and the response packet to the request packet (including the information that the channel time cannot be allocated) are transmitted. As such, communication delay and band waste by inefficient contention and unnecessary packet transmission can be reduced. As a result of the beacon analysis, if there is an allocable CTB, the station having the data to be transmitted competes in the unreserved CTB, thereby requesting the allocation of the CBT from the coordinator.

The beacon-period field 620 indicates the time interval where the beacon 400 is transmitted. The station can inform of the point of time when the next beacon is transmitted through the beacon-period field 620.

A reserved field 630 is a reserved field for setting additional information on beacon 400.

Hereinafter, the operation process and the structure of the coordinator 110 and the station 120-1 according to an exemplary embodiment of the present invention are described in detail.

Figure 7:
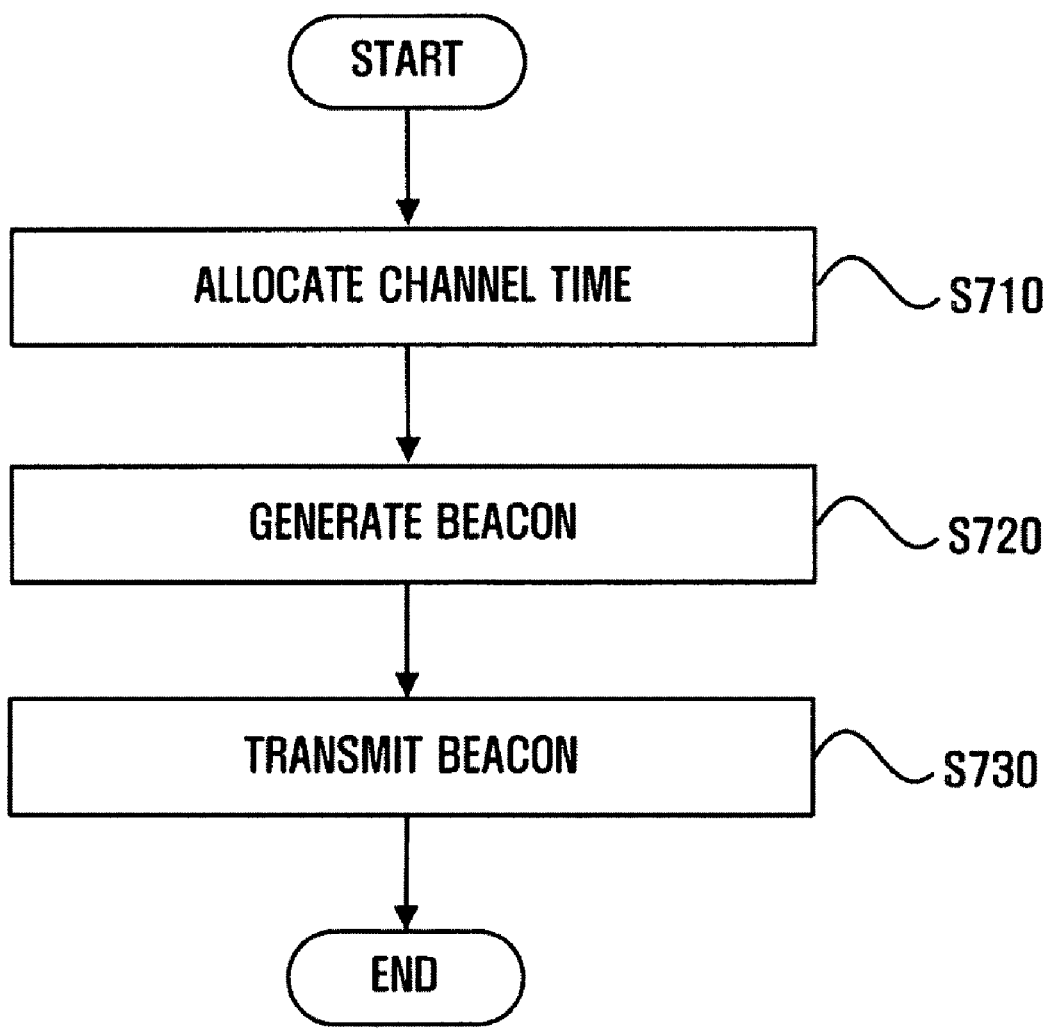
FIG. 7 is a flowchart illustrating a wireless communication process according to an exemplary embodiment of the present invention.

FIG. 7 is a flowchart illustrating a wireless communication process according to an exemplary embodiment of the present invention.

The coordinator 110 allocates channel time to each of stations 120-1, 120-2 and 120-3 according to the request of at least one of the stations 120-1, 120-2 and 120-3 within the wireless network 100 (S710).

The coordinator 110 generates a beacon that includes channel-time-allocation information (S720). An example of the channel-time-allocation information has been described with reference to FIG. 5, and an example of a beacon has been described with reference to FIG. 4. The information on the beacon-reception interval can also be included in the beacon. Further, when a beacon is generated, the position of the coordinator 110 CBCP and the time interval can be determined, and the information can be included in the beacon. Preferably, but not necessarily, the CBCP information that has been included in the beacon generated for the first time when the coordinator 110 starts the wireless network 100 is used in the beacon generated while the wireless network 100 is continued in the same manner.

The coordinator that generates the beacon 110 outputs the generated beacon to the beacon period 311 by the wireless network 100 (S730). Preferably, but not necessarily, the beacon is transmitted through the LRP layer channel.

Figure 8:
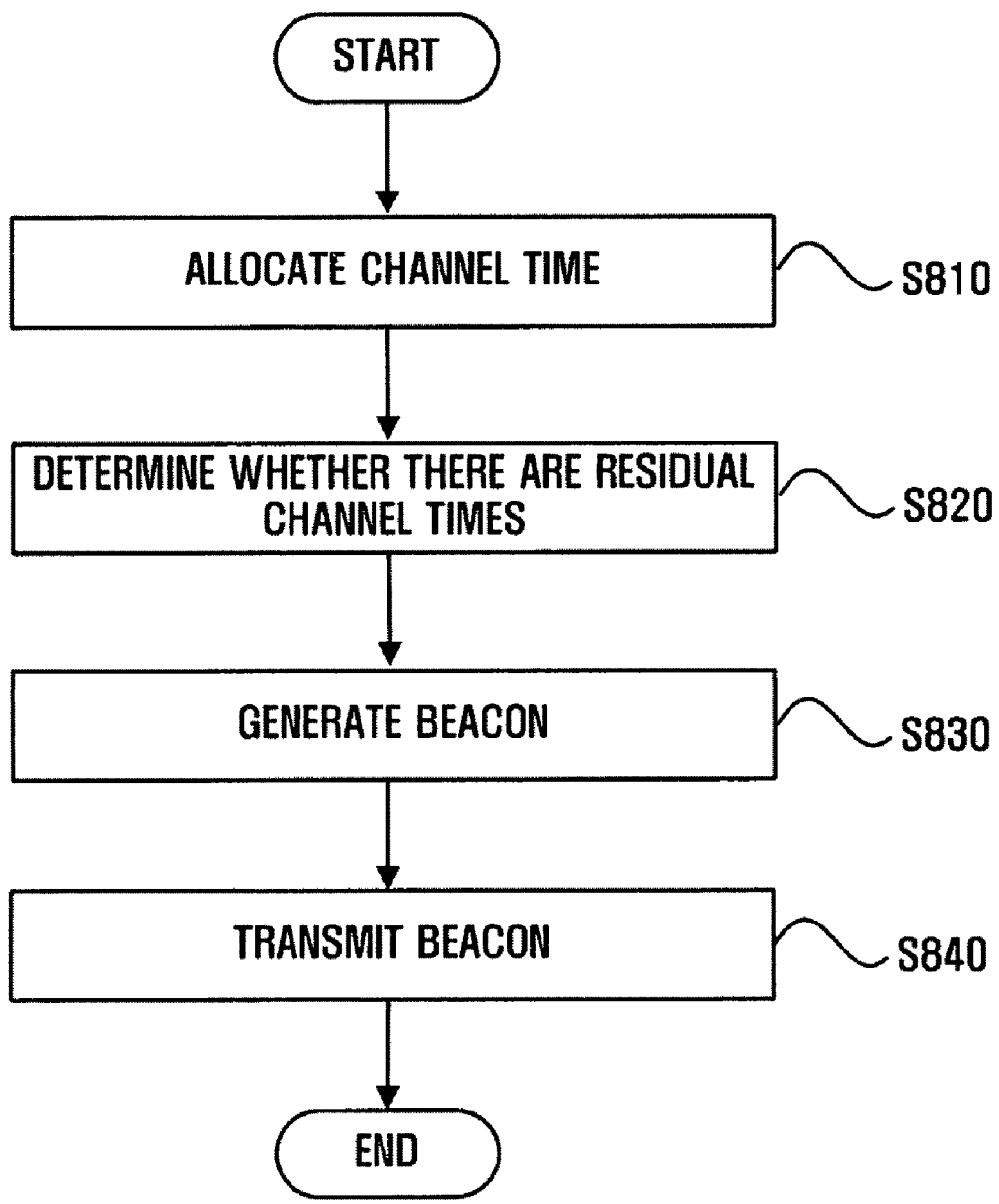
FIG. 8 is a flowchart illustrating a wireless communication process according to another exemplary embodiment of the present invention.

Further, according to an exemplary embodiment of the present invention, the coordinator 110 can include the free-channel-time field 610 described with reference to FIG. 6, and the process is illustrated in FIG. 8.

The coordinator 110 allocates channel time to each of the stations 120-1, 120-2 and 120-3 according to the request of one of the stations 120-1, 120-2 and 120-3 within the wireless network 100 (S810).

Here, the coordinator 110 determines whether there are extra channel times allocable to the one of the stations 120-1, 120-2 and 120-3 in the superframe scheduled to the next beacon (S820).

Then, the coordinator 110 generates a beacon that includes information that there are or are not extra channel times depending on the result of the determination (S830), and transmits the generated beacon to the wireless network 100 (S840).

FIGS. 7 and 8 have been described as if the CBCP information and the information on whether there are extra channel times were independently included in the beacon, respectively, but the present invention is not limited to this, and the processes of FIGS. 7 and 8 can be executed in parallel. In other words, the coordinator 110 can generate a beacon that includes both the CBCP information and the information on whether there are extra channel times, and transmit the information to the wireless network 100.

Figure 9:
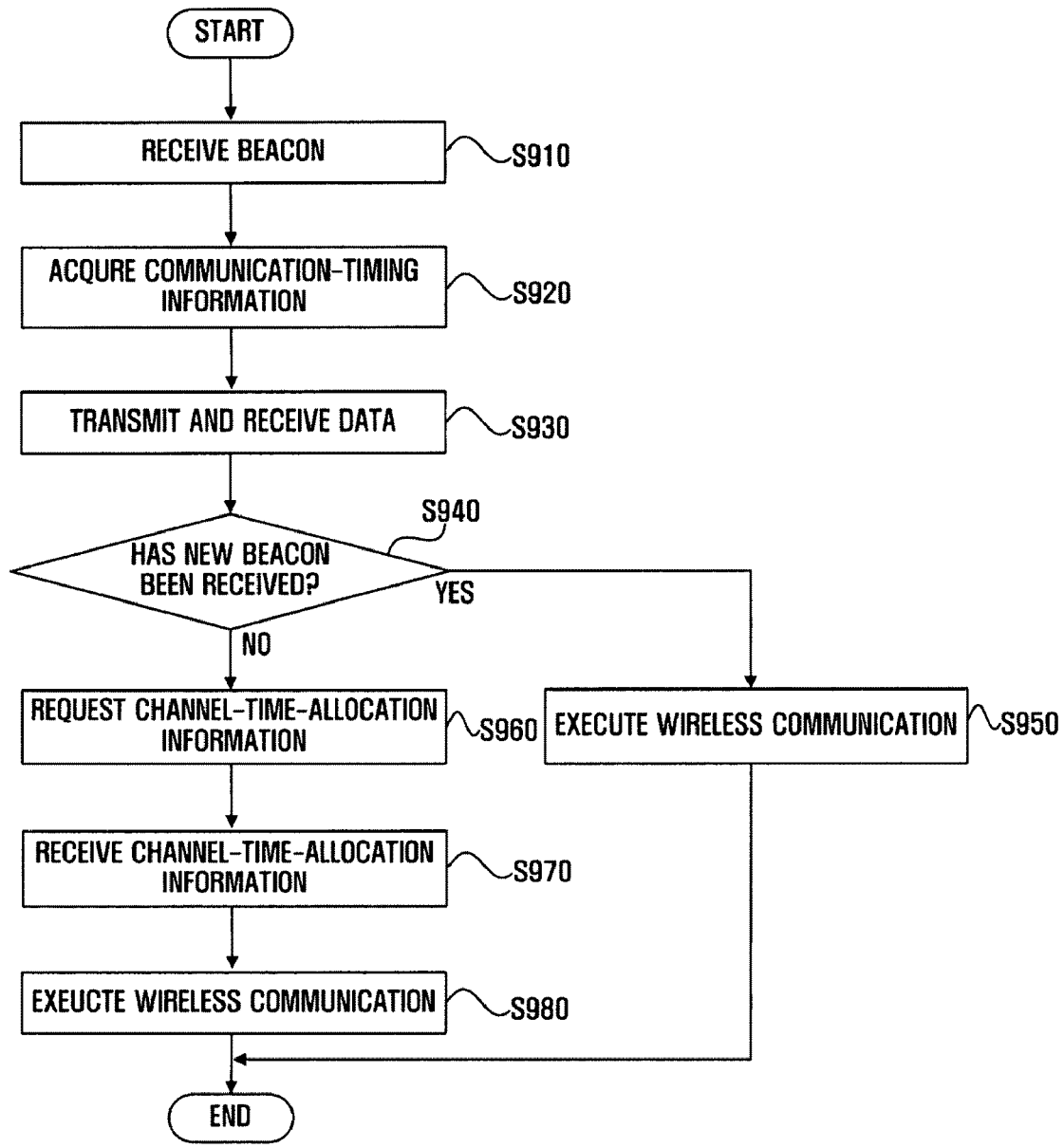
FIG. 9 is a flowchart illustrating a wireless communication process according to another exemplary embodiment of the present invention.
Figure 11:
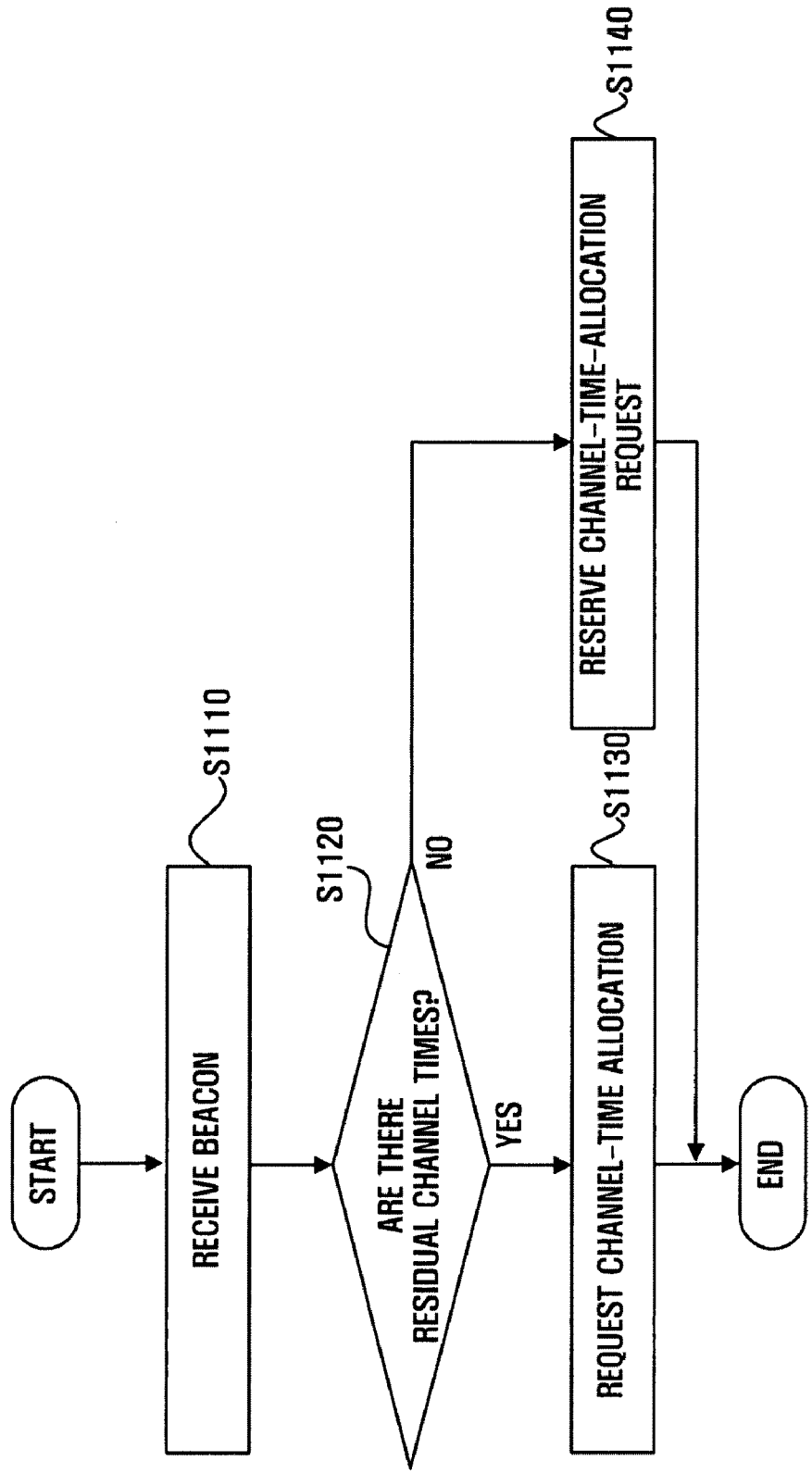
FIG. 11 is a flowchart illustrating a wireless communication process according to another exemplary embodiment of the present invention.

The station 120-1 of the wireless network 100 can receive the beacon transmitted by the coordinator 110, and the operation process of the station 120-1 that has received the beacon is illustrated in FIGS. 9 and 11. FIGS. 9 and 11 illustrate the case where the station 120-1 uses CBCP information included in the beacon, and the case where the station 120-1 uses the information on whether there are extra channel times included in the beacon, respectively. However, the station does not use only one of the CBCP information and the information on whether there are extra channel times, and all of the information is used by analyzing the received beacon.

FIG. 9 is a flowchart illustrating the wireless communication process according to an exemplary embodiment of the present invention.

If the beacon is received from the coordinator 110 through a wireless medium (preferably, but not necessarily, the LRP layer channel) (S910), the station 120-1 analyzes the beacon, and can get to know communication-timing information such as channel-time-allocation information, a beacon-transmission interval, and CBCP (S920).

Then, the station 120-1 occupies the medium, and transmits and receives necessary data according to the revealed channel-time-allocation information (S930). In other words, the station 120-1 can use the reserved CTB allocated to the station itself, or occupy the medium in the unreserved CTB through the contention, and thus can transmit and receive data, MAC command, control packets, and others.

Then, the station 120-1 determines whether the beacon is received at the time when the next beacon is expected to be received (S940). If the beacon is received, the station 120-1 executes wireless communication according to the communication-timing information revealed through the newly-received beacon (S950). However, if the new beacon is not received, the station 120-1 requests the channel-time-allocation information from the coordinator 110 in the new CBCP, which is predicted through the position and the period of the CBCP revealed in S920, S960.

Then, if the channel-time-allocation information is received from the coordinator 110 (S970), the station 120-1 executes the wireless communication using the information (S980).

Figure 10:
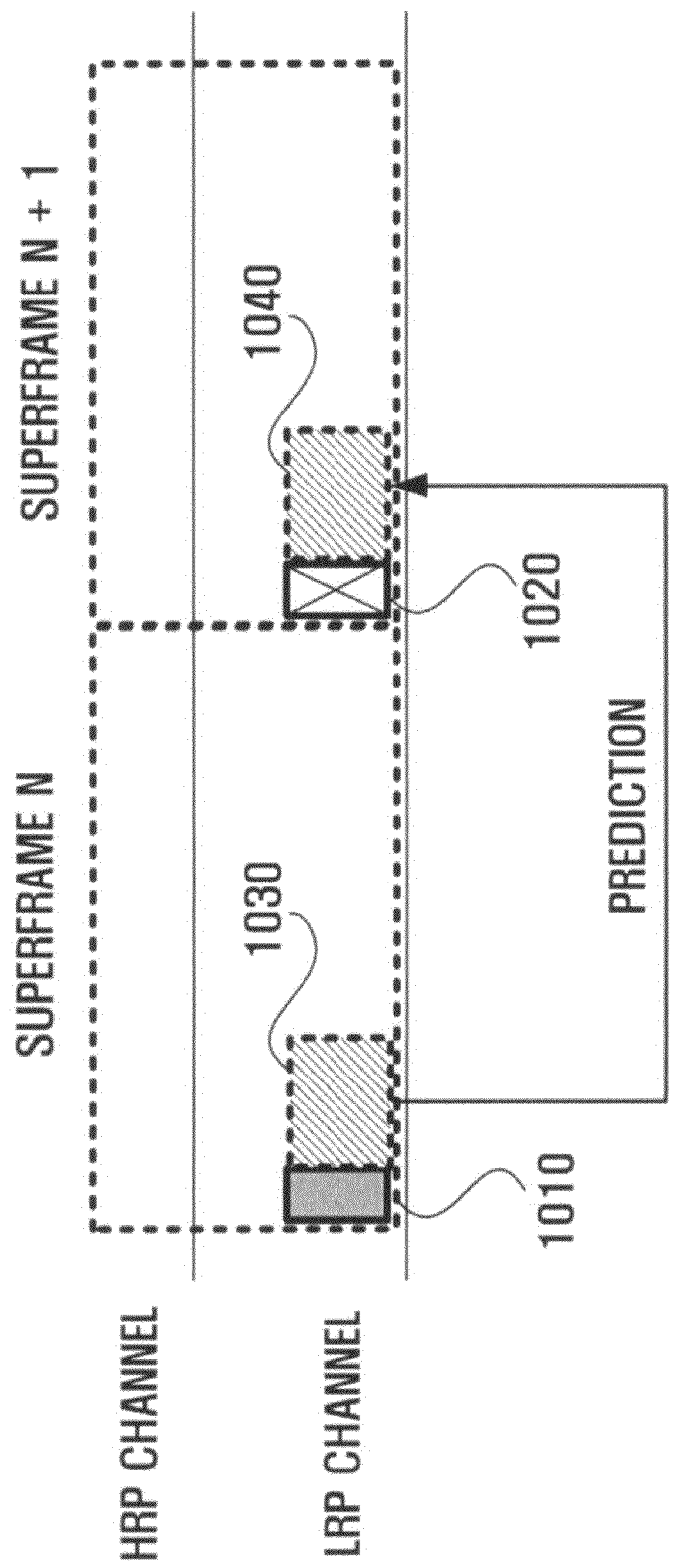
FIG. 10 illustrates a communication timing according to an exemplary embodiment of the present invention.

For the better understanding on FIG. 9, an example of a case that uses the CBCP is illustrated in FIG. 10. The station 120-1 can receive a beacon 1010, thereby getting to know the CBCP 1030 in the superframe N, the reserved CBT (not shown), the unreserved CTB (not shown), and the receiving point of time of the next beacon 1020. If the beacon 1020 is not received in the receiving point of time of the next beacon 1020, the station 120-1 cannot get to know the communication timing in the superframe N+1. Here, the station can predict the CBCP 1040 in the superframe N+1 using the information on the CBCP 1030 of the superframe N, and can request the communication-timing information in the superframe N+1 from the coordinator 110 by competitively occupying the medium in the CBCP 1040. The station 120-1 can predict the CBCP 1040 because the CBCP is repeated at the same position and at regular time intervals for each superframe.

FIGS. 9 and 10 illustrate the case where the station 120-1 fails to receive the beacon once. However, the present invention is not limited to this case. The station 120-1 can predict currently-available CBCPs using the beacon-transmission interval and the CBCP that have been revealed through the previously-received beacon, and can request the channel-time-allocation information from the coordinator 110 in the predicted CBCP. Here, the critical number of times can be set in advance as an appropriate number considering the capabilities of the station 120-1 and the purpose of the wireless network 100.

FIG. 11 is a flowchart illustrating a wireless communication process according to an exemplary embodiment of the present invention.

If a beacon is received from the coordinator 110 through a wireless medium (preferably, but not necessarily, an LRP channel) (S1110), the station 120-1 checks whether there are residual channel times by analyzing the received beacon (S1120). Whether there are residual channel times can be checked through the free-channel-time field 610 described with reference to FIG. 6.

If there are residual channel times, the station 120-1 can occupy the medium through the contention in the unreserved CTB revealed by the received beacon, and request the channel-time allocation from the coordinator 110 (S1130). Here, the channel-time-allocation request is executed in the case where the station 120-1 needs the channel time for the data transmission. However, if there is no residual channel time, the station 120-1 does not try the channel-time-allocation request in the unreserved CTB that exists until the unreserved CTB, i.e., the next beacon, is received in the current superframe (S1140).

Figure 12:
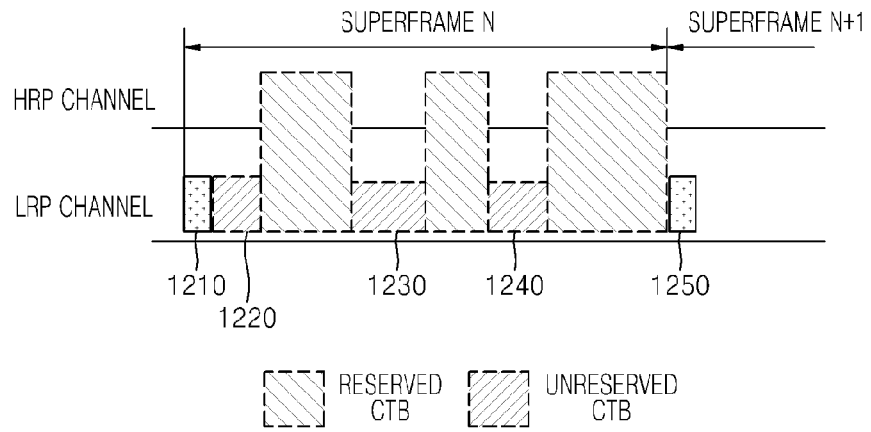
FIG. 12 illustrates a communication timing according to another exemplary embodiment of the present invention.

In other words, if the beacon 1210 includes the information that there is no residual channel time in the communication timing of FIG. 12, the station that has received the beacon 1210 does not try the medium occupation for the request of the channel-time allocation from the coordinator 110 in the unreserved CTBs 1220, 1230, and 1240 of the superframe N. Hence, the unreserved CTBs 1220, 1230, and 1240 can be used for the transmission of other information.

An example of saving wireless resources using a beacon has been described in the above. However, the same purpose can be fulfilled by using a MAC command, which is described in the following with reference to FIGS. 13 and 14.

Figure 13:
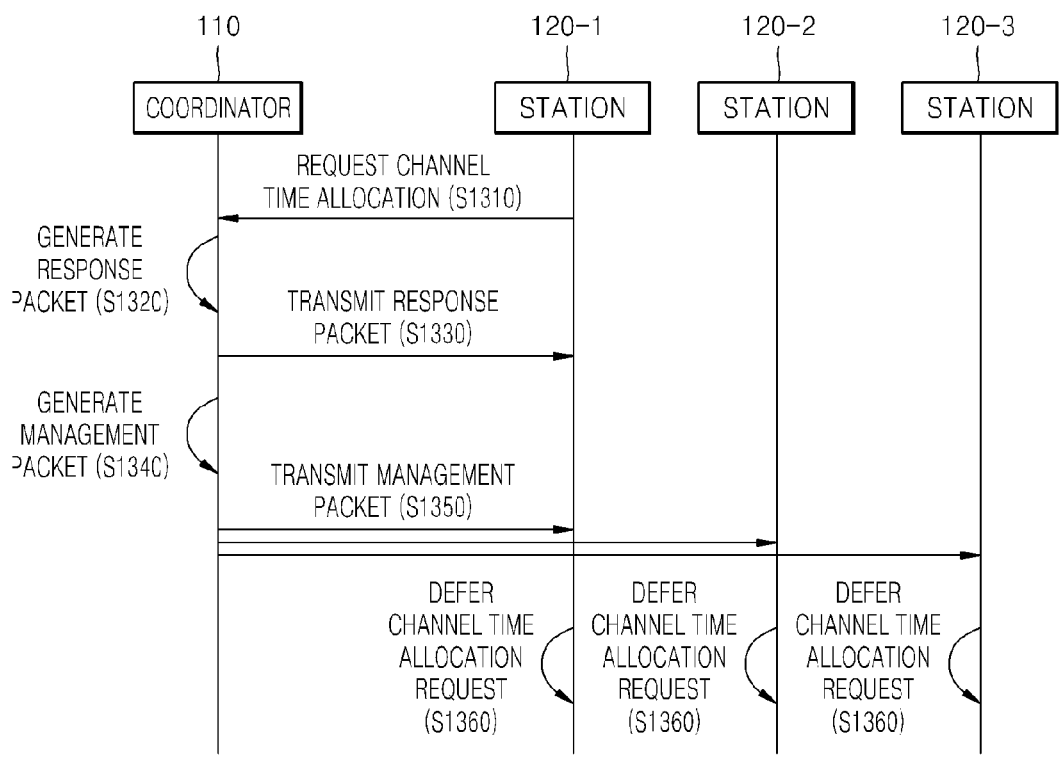
FIG. 13 is a flowchart illustrating a wireless communication process between a coordinator and a station according to an exemplary embodiment of the present invention.

FIG. 13 is a flowchart illustrating a wire communication process between the coordinator 110 and the station 120 according to an exemplary embodiment of the present invention.

The station 120-1 that needs the channel time for the data transmission can request the channel-time allocation from the coordinator 110 using the unreserved CTB (S1310).

The coordinator that receives the channel-time-allocation request from the station 120-1 determines whether there are residual channel times that can be allocated to the station 120-1. If there is no channel time, the coordinator 110 generates a response packet that informs the station 120-1 of the fact that there is no residual channel time, and transmits the packet to stations 120-1 (S1330).

However, in the situation where there is no allocable residual channel time, other stations 120-2 and 120-3 within the wireless network 100 cannot know that there is no residual channel time until a new beacon that includes such information is transmitted. Here, in the case where the station 120-2 or the station 120-3 unnecessarily competes in the unreserved CTB in order to request the channel-time allocation, or occupies the medium through the competition, wireless resources can be wasted in that the station 120-2, or the station 120-3 requests the channel-time allocation, and the coordinator 110 transmits a negative response to the request.

Hence, in the case where there is no residual channel time, the coordinator 110 can generate a management packet that includes information that there is no residual channel time (S1340), and can transmit the generated management packet to the stations 120-1, 120-2 and 120-3 of the wireless network 100 using the unreserved CTB (S1350). Here, the stations 120-1, 120-2 and 120-3 reserve the channel-time-allocation request during the residual unreserved CTB in the current superframe (S 1360). Here, the management packet is a packet used to manage the network, and can be implemented as a MAC command or a control packet.

Though not shown in FIG. 13, in the case where there are extra channel times, the coordinator 110 can allocate the channel time according to the request of one of the stations 120-1, 120-2 and 120-3, and transmit the response packet that informs of the allocation of the channel time to the one of the stations 120-1, 120-2 and 120-3.

Figure 14:
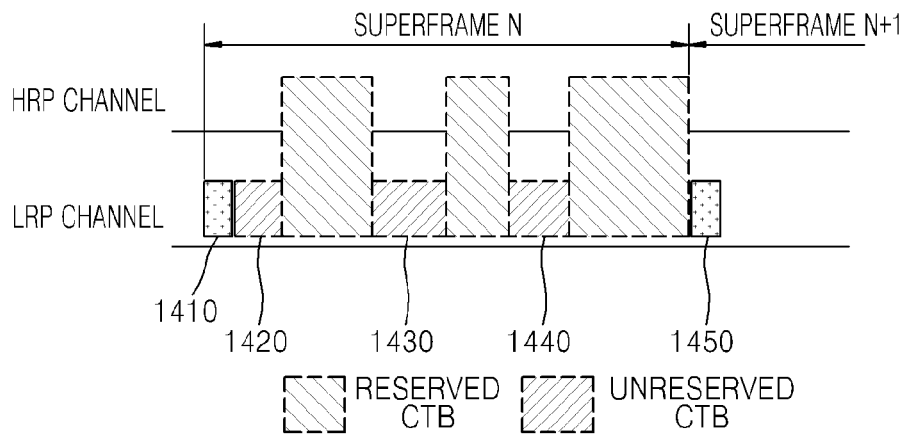
FIG. 14 illustrates a communication timing according to another exemplary embodiment of the present invention.

For the better understanding of the process of FIG. 13, a superframe according to an exemplary embodiment of the present invention is illustrated in FIG. 14. First, in the case where there are allocable residual channel times, the information that there are residual channel times can be included in the beacon 1410. The one of the stations 120-1, 120-2 and 120-3 that receives the beacon 1410 can request the channel-time allocation to another of stations 120-1, 120-2 and 120-3 in the unreserved CTBs 1420, 1430, and 1440.

If all channel times are allocated in the unreserved CTB 1430, the coordinator 110 can generate a management packet that includes the information that there is no residual channel time, and can transmit the management packet to one of the stations 120-1, 120-2 and 120-3 in the unreserved CTB 1430. Because the management packet that includes the information that there is no residual channel time is important for the saving of wireless resources, it is preferable, but not necessary, for the coordinator 110 to hold a dominant position in occupying the medium than other of stations 120-1, 120-2 and 120-3 for the transmission of the management packet. For example, the coordinator 110 that intends to transmit the management packet that includes the information that there is no residual channel time can occupy the wireless medium earlier than other stations.

The one of the stations 120-1, 120-2 and 120-3 that receives the management packet from the coordinator 110 reserves the channel-time-allocation request from the point of time when the management packet is received until the next beacon 1250 is received. In other words, the residual time of the reserved CTB 1230 and the reserved CTB 1240 can be used for the transmission of other commands or control packets not including the channel-time-allocation request. Here, the information that there is no residual channel time is included in the next beacon 1250, and the one of the stations 120-1, 120-2 and 120-3 that receives the beacon 1250 reserves the channel-time-allocation request in the superframe N+1.

Figure 15:
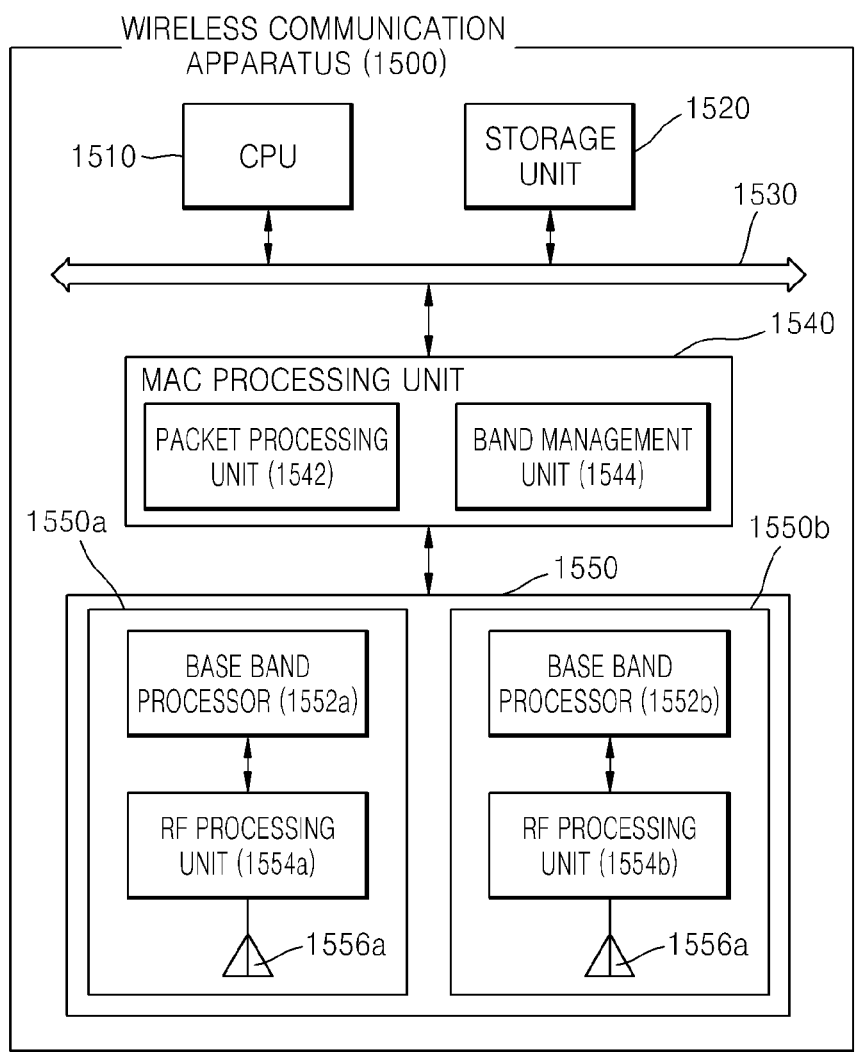
FIG. 15 a block diagram illustrating a wireless communication apparatus according to an exemplary embodiment of the present invention.

FIG. 15 is a block diagram illustrating the wireless communication apparatus according to an exemplary embodiment of the present invention. The wireless communication apparatus 1500 is the aforementioned coordinator 110. The wireless communication apparatus 1500 includes a CPU 1510, a storage unit 1520, a MAC-processing unit 1540, and a transceiver 1550.

The CPU 1510 controls other elements connected to a bus 1530, and is in charge of handling upper layers (e.g., a logical link control (LLC) layer, a network layer, a transport layer, and an application layer) of the media access control (MAC) layer of general communication layers. Hence, the CPU 1510 handles the received data provided from the MAN-handling data 1540 or generates transport data, and then provides to the MAC-processing unit 1540. For example, the data generated or handled by the CPU 1510 can be uncompressed AV data.

The storage unit 1520 stores the received data handled by the CPU 1510 or transport data generated by the CPU 1510.

The storage unit 1520 can be implemented as a non-volatile memory device such as a ROM, a PROM, an EPROM, an EEPROM, and a flash memory, a volatile memory device such as a RAM, and other arbitrary memories known in the concerned field.

The MAC-processing unit 1540 plays the role of the MAC layer of the wireless-communication apparatus 1500. Specifically, the MAC-processing unit 1540 includes a packet-processing unit 1542 and a band-management unit 1544.

The packet-processing unit 1542 generates packets to be transmitted to other devices or packets received from other devices. For example, the packet-processing unit 1542 can generate the beacon described with reference to FIG. 4, the management packet mentioned in the description of FIG. 13, the MAC command, and the control packet. Further, the packet-processing unit 1542 can generate the data packet that includes uncompressed AV data, or can extract uncompressed AV data from the data packet received from other devices, thus transmitting the extracted data to the CPU 1510.

The band-management unit 1544 manages the wireless-communication band used in the wireless network. For example, the band-management unit 1544 allocates the channel time necessary to the station 120 that has requested the channel-time allocation, and schedules the communication timing.

The transceiver 1550 transmits the packet transmitted from other devices to the wireless medium, receives the packet transmitted from other devices, and delivers the received packet to the MAC-processing unit 1540. The transceiver 1550 includes a first physical-processing unit 1550*a* and a second physical-processing unit 1550*b*. Here, the first physical-processing unit 1550*a* is implemented by the LRP layer, and the second physical-processing unit 1550*b* is implemented by the HRP. In other words, according to the direction of the MAC-processing unit 1540, the first physical-processing unit 1550*a* transmits and receives the packet to the LRP layer channel, and the second physical-processing unit 1550*b* transmits and receives the packet to the HRP channel. The packet-transmission-and-reception process of the first physical-processing unit 1550*a* and the second physical-processing unit 1550*b* is controlled in a time division way by the MAC-processing unit 1540.

The second physical-processing unit 1550*b* can be divided into a base-band processor 1552*b* that handles a base-band signal, and a RF-processing unit 1554*b* that generates a wireless signal from the handled base-band signal, and transmits the generated wireless signal through an antenna 1556*b*.

Specifically, the base-band processor 1552*b* executes a frame-formatting and channel-coding, and the RF-processing unit 1554*b* executes operations such as the amplification of analogue waves, the conversion of analogue and digital signals, and the modulation. Further, it is preferable, but not necessary, for the antenna 1556*b* to be constituted as an array antenna so as to make the beam-steering possible. The array antenna can be a form where a plurality of antenna elements are arranged in a row. However, the present invention is not limited to the form. For example, the array antenna can be constituted by a plurality of antenna elements arranged in a two-dimensional matrix form, in which a more elaborate and cubic beam-steering is possible.

The first physical-processing unit 1550*a* has a similar structure as the second physical-processing unit 1550*b*. However, since the communication channels and the types of transmitted and received packets used by the first physical-processing unit 1550*a* and the second physical-processing unit 1550*b* are different from each other, the base-band-processing unit 1552*a* and the base-band-processing unit 1552*b* can use different channel-coding methods and different channel-coding parameters.

The transceiver 1550 does not always have to include both the first physical-processing unit 1550*a* and the second physical-processing unit 1550*b*, and only the first physical channel 1550*a* can be included depending on the exemplary embodiment. Further, the second physical-processing unit 1550*b* can have only one of the packet-transmitting function and the packet-receiving function using the HRP channel.

Figure 16:
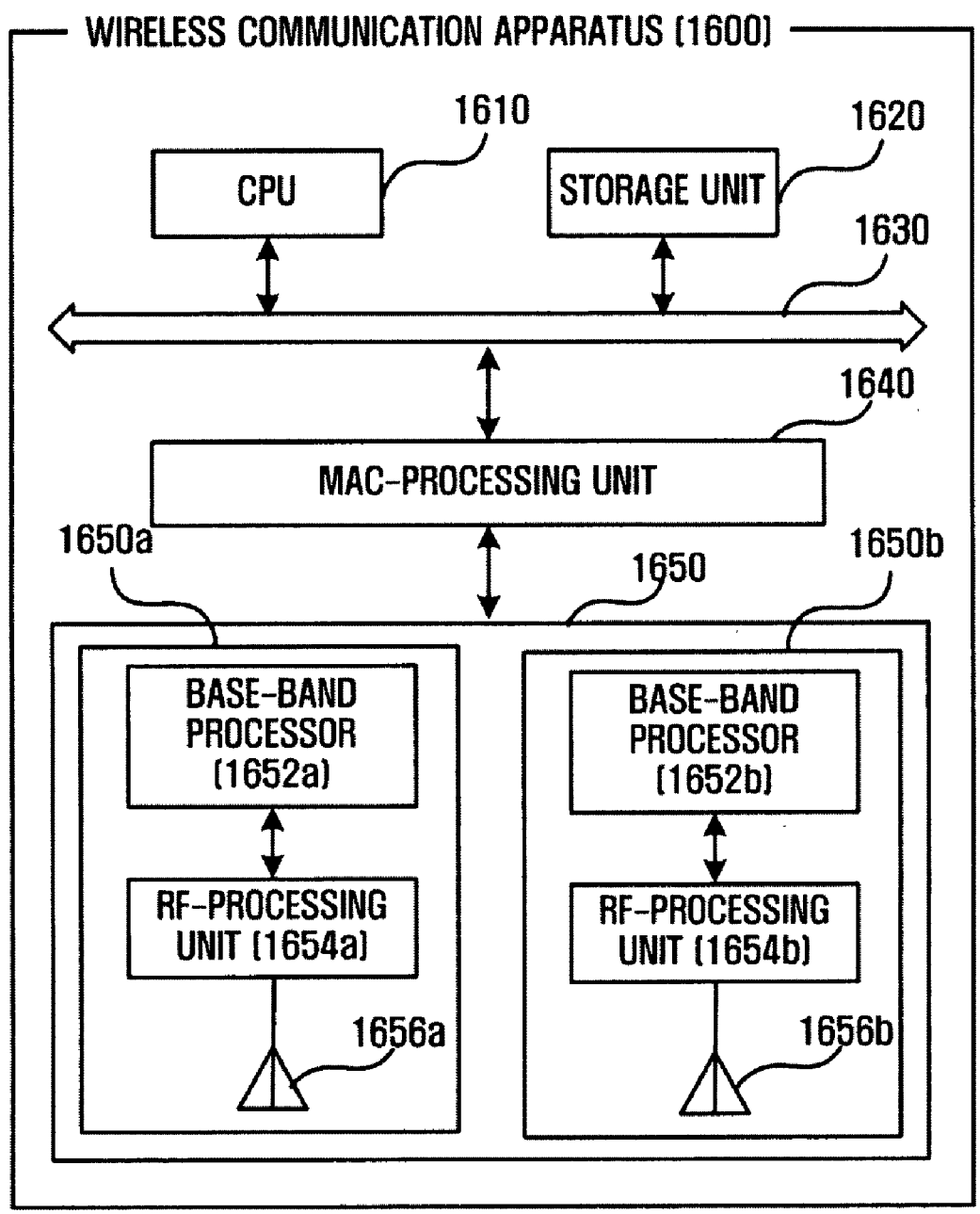
FIG. 16 is a block diagram illustrating a wireless communication apparatus according to another exemplary embodiment of the present invention.

FIG. 16 is a block diagram illustrating a wireless communication apparatus according ton an exemplary embodiment of the present invention. Any of the aforementioned stations 120-1, 120-2 and 120-3 can take the form of a wireless communication apparatus 1600. The wireless communication apparatus 1600 includes a CPU 1610, a storage unit 1620, a MAC-processing unit 1640, and a transceiver 1650.

The functions of elements that constitute the wireless communication apparatus 1600 are basically similar to the functions of elements of the wireless communication apparatus 1500 described with reference to FIG. 15. Hence, only the major functions of the MAC-processing unit 1640 among the elements of the wireless communication apparatus 1500 will be described in the following. The functions of other elements and the general functions of the MAC-processing unit 1640 can be understood through the function of elements of the wireless communication apparatus 1500 described with reference to FIG. 15.

In the case where a channel time is necessary for the data transmission, the MAC-processing unit 1640 generates a packet for the channel-time-allocation request, and when the packet that includes the information on the channel-time allocation transmitted from the coordinator 110 is received, the MAC-processing unit 1640 analyzes the information, and prepares for the packet transmission. Further, when a beacon is received from the coordinator 110, the MAC-processing unit 1640 controls the transceiver 1650 so that the data packet is transmitted to the channel time allocated to the wireless communication apparatus 1600.

Further, the MAC-processing unit 1640 checks the point of time when the next beacon is transmitted and the CBCP information in the beacon. In the case where the next beacon is not received at the appropriate time, the MAC-processing unit 1640 generates the packet for the channel-time-allocation information for the time interval assumed by the CBCP information, and controls the transceiver 1650 so that the packet is transmitted to the coordinator 110. If the channel-time-allocation information is received from the coordinator 110, the MAC-processing unit 1640 makes the communication executed at the appropriate time considering the information.

Further, the MAC-processing unit 1640 can check whether there are residual channel times through the transmitted management packet. Depending on whether there are residual channel times, the MAC-processing unit 1640 can determine whether to execute contention in order to request a channel-time allocation in the unreserved CTB.

The wireless communication process executed by the wireless communication apparatus 1500 and 1600 described with reference to FIGS. 15 and 16 can be understood the operation process of the coordinator 110 and the stations 120-1, 120-2 and 120-3 described with reference to FIGS. 1 to 13.

The elements of the wireless communication apparatus described with reference to FIG. 15 and the wireless communication apparatus 1600 described with reference to FIG. 16 can be implemented as modules. The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Further, processes described with reference to FIGS. 4 to 8 can be implemented as an application program by those of ordinary skill in such a field. By recording such a program in a computer-readable storage medium readable and executing the program in a computer, the exemplary embodiments described in the present specification and other similar exemplary embodiments can be implemented, and therefore such cases are included in the scope of the present invention.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

The method and apparatus of the present invention reduces the waste of wireless resources, which is advantageous.

What is claimed is:

1. A non-transitory computer-readable recording medium having recorded thereon computer-readable instructions, which when executed by a computer cause the computer to execute a method of generating a beacon packet, the method comprising:
   generating the beacon packet, wherein the beacon packet comprises:
      a first information field comprising channel-time-allocation information in a wireless network; and
      a free channel time field comprising information about whether there is a residual channel time that can be allocated to a device that belongs to the wireless network,
   wherein the beacon packet further comprises a contention-based control period (CBCP) field comprising information on the CBCP, wherein the device that belongs to the wireless network can occupy a medium through contention in the CBCP, and the CBCP has a fixed temporal position.

2. The computer-readable medium of claim 1, wherein the beacon packet further comprises:
   a beacon-period field that indicates a transmission interval of the beacon packet.

3. The computer-readable medium of claim 1, wherein the CBCP field further comprises information on a termination time-point of the CBCP.

4. The computer-readable medium of claim 1, wherein the CBCP field further comprises information on a start time-point of the CBCP.

5. The computer-readable medium of claim 1, wherein the CBCP immediately follows a beacon period when the beacon packet is transmitted.

6. The computer-readable medium of claim 1, wherein the beacon packet further comprises:
   a reserved field for a setting of additional information on the beacon packet.

7. The computer-readable medium of claim 1, wherein the beacon packet further comprises:
   at least one second information field in which management information of the wireless network where the beacon packet is broadcast, is set.

8. The computer-readable medium of claim 1, wherein the beacon packet is generated by a coordinator that manages the wireless network.

9. A wireless communication method comprising:
   generating, by a coordinator, a management packet that includes a free channel time field comprising information about whether there is a residual channel time that can be allocated to a device that belongs to a wireless network; and
   in response to determining that there is the residual channel time that can be allocated, transmitting, by the coordinator, the generated management packet via a wireless medium to the device that belongs to the wireless network,
   wherein the management packet further comprises a contention-based control period (CBCP) field comprising information on the CBCP, wherein the device that belongs to the wireless network can occupy the wireless medium through contention in the CBCP, and the CBCP has a fixed temporal position.

10. The method of claim 9, wherein the generating comprises:
    allocating channel times to said device that belongs to the wireless network;
    determining whether there is the residual channel time as a result of the allocation of the channel time; and
    generating the management packet further comprising information corresponding to a result of the determining.

11. The method of claim 9, wherein the management packet further comprises channel-time-allocation information in the wireless network.

12. The method of claim 9, wherein the information on the CBCP includes information on a termination time-point of the CBCP.

13. The method of claim 9, wherein the information on the CBCP includes information on a start time-point of the CBCP.

14. The method of claim 9, wherein the CBCP immediately follows a beacon period when a beacon packet is transmitted.

15. The method of claim 9, further comprising:
    receiving a request of channel-time-allocation information in the wireless network from the device in the CBCP; and
    transmitting the requested channel-time-allocation information to the device.

16. The method of claim 9, wherein the wireless network uses two communication channels whose supportable transmission rates are different in time division.

17. The method of claim 16, wherein the management packet is transmitted via the communication channel whose supportable transmission rate is low among the two communication channels.

18. The method of claim 9, wherein the wireless network supports at least one transmission of uncompressed video data, uncompressed audio data, and uncompressed data that includes video information and audio information.

19. A wireless communication method performed by a wireless communication apparatus, the method comprising:

receiving, by the wireless communication apparatus, a management packet that includes a residual channel time field comprising information about whether there is a residual channel time that can be allocated to a device that belongs to a wireless network; and determining, by the wireless communication apparatus, whether the wireless communication apparatus requests a channel-time allocation from a coordinator that manages the wireless network according to the information about whether there is the residual channel time included in the received management packet and receiving the determined channel-time allocation, wherein the management packet further comprises a contention-based control period (CBCP) field comprising information on the CBCP, wherein the device that belongs to the wireless network can occupy a medium through contention in the CBCP, and the CBCP has a fixed temporal position.

20. The method of claim 19, wherein the determining comprises:
stopping the wireless communication apparatus from requesting the channel-time-allocation for a predetermined time interval if the received management packet includes the information indicating that there is no residual channel time.

21. The method of claim 20, wherein the predetermined time interval is from a point of time when the management packet is received to a point of time when a new beacon packet is received.

22. The method of claim 19, wherein the management packet further comprises channel-time-allocation information in the wireless network.

23. The method of claim 19, wherein the information on the CBCP includes information on a termination time-point of the CBCP.

24. The method of claim 19, wherein the information on the CBCP includes information on a start time-point of the CBCP.

25. The method of claim 19, wherein the CBCP exists right after a beacon period when a beacon packet is transmitted.

26. The method of claim 19, further comprising:
requesting a channel-time-allocation information from the coordinator in the CBCP; and
receiving the channel-time-allocation information from the coordinator.

27. The method of claim 26, further comprising:
communicating according to the received channel-time-allocation information.

28. A wireless communication apparatus comprising:
a media access control (MAC)-processing unit that generates a management packet having a residual channel time field comprising information about whether there is a residual channel time that can be allocated to a device that belongs to a wireless network; and
a transceiver that transmits the generated management packet to the device that belongs to the wireless network via a wireless medium through contention in the contention-based control period (CBCP),
wherein the management packet further comprises a contention-based control period (CBCP) field comprising information on the CBCP, wherein the device that belongs to the wireless network can occupy the medium through contention in the CBCP, and the CBCP has a fixed temporal position.

29. The apparatus of claim 28, wherein the MAC-processing unit generates the management packet that includes the information about whether there is the residual channel time, according to a result of allocating the channel time to at least one of devices that belong to the wireless network.

30. The apparatus of claim 28, wherein the management packet includes channel-time-allocation information in the wireless network.

31. The apparatus of claim 28, wherein the information on the CBCP includes information on a termination time-point of the CBCP.

32. The apparatus of claim 28, wherein the information on the CBCP includes information on a start time-point of the CBCP.

33. The apparatus of claim 28, wherein the CBCP exists right after a beacon period when a beacon packet is transmitted.

34. The apparatus of claim 28, wherein the transceiver receives a packet that requests a channel-time-allocation information in the wireless network from the device in the CBCP, and transmits the requested channel-time-allocation information to the device; and wherein the MAC-processing unit provides the channel-time-allocation information.

35. The apparatus of claim 28, wherein the wireless network is a network that uses two communication channels whose supportable transmission rates are different in time division; and wherein the transceiver comprises a first physical-processing unit that uses a first communication channel that supports a lower transmission rate among the two communication channels.

36. The apparatus of claim 35, wherein the first physical-processing unit transmits the management packet.

37. The apparatus of claim 35, wherein the transceiver further comprises a second physical-processing unit that uses a second communication channel that supports a higher transmission rate among the two communication channels.

38. The apparatus of claim 28, wherein the wireless network supports at least one transmission of uncompressed video data, uncompressed audio data, and uncompressed data that includes video information and audio information.

39. A wireless communication apparatus comprising:
a transceiver that receives a management packet including a residual channel time field comprising information about whether there is a residual channel time that can be allocated to a device that belongs to a wireless network; and
a media access control (MAC)-processing unit that determines whether the wireless communication apparatus requests a channel-time allocation from a coordinator that manages the wireless network according to the received information about whether the residual channel time is included in the received management packet and in response to determining that the wireless communication apparatus requests the channel-time allocation receiving the channel-time allocation,
wherein the management packet further comprises a contention-based control period (CBCP) field comprising information on the CBCP, wherein the device that belongs to the wireless network can occupy a medium through contention in the CBCP, and the CBCP has a fixed temporal position.

40. The apparatus of claim 39, wherein the MAC-processing unit stops a transmission of the channel-time-allocation request for a predetermined time interval if the management packet includes information that there is no residual channel time.

41. The apparatus of claim 40, wherein the predetermined time interval is from a point of time when the management packet is received to a point of time when a new beacon packet is received.

42. The apparatus of claim 39, wherein the management packet includes channel-time-allocation information in the wireless network.

43. The apparatus of claim 39, wherein the information on the CBCP includes information on a termination time-point of the CBCP.

44. The apparatus of claim 39, wherein the information on the CBCP includes information on a start time-point of the CBCP.

45. The apparatus of claim 39, wherein the CBCP immediately follows a beacon period when a beacon packet is transmitted.

46. The apparatus of claim 39, wherein the transceiver transmits a packet requesting channel-time-allocation information in the CBCP from the coordinator, and receives the channel-time-allocation information from the coordinator.

47. The apparatus of claim 46, wherein the MAC-processing unit controls data transmission and reception of the transceiver according to the received channel-time-allocation information.

48. A non-transitory computer-readable recording medium that records a computer-readable program that executes the method of claim 9.

49. A non-transitory computer-readable recording medium that records a computer-readable program that executes the method of claim 19.

\* \* \* \* \*